United States Patent

Stanton et al.

[11] Patent Number: 6,040,846
[45] Date of Patent: Mar. 21, 2000

[54] IMPACT RESISTANT DISPLAY APPARATUS

[75] Inventors: Stephen Millard Stanton; James Talmage Davis, II; Alan James Dutson, all of Fort Worth; Gregory Lane Henderson, Watauga, all of Tex.

[73] Assignee: Motorola, Inc., Schaumburg, Ill.

[21] Appl. No.: 09/024,040

[22] Filed: Feb. 16, 1998

[51] Int. Cl.[7] .................................................. G09G 5/00
[52] U.S. Cl. ............................................ 345/905; 345/102
[58] Field of Search .................................. 345/905, 901, 345/102, 76, 80, 87; 340/825.44

[56] References Cited

U.S. PATENT DOCUMENTS

| | | | |
|---|---|---|---|
| 4,553,143 | 11/1985 | Lustig | 345/80 |
| 4,562,478 | 12/1985 | Hirasawa | 345/102 |
| 5,627,725 | 5/1997 | Yamada et al. | 345/102 |

FOREIGN PATENT DOCUMENTS

| | | | |
|---|---|---|---|
| 401222291 | 9/1989 | Japan | 345/905 |
| 404196727 | 7/1992 | Japan | 345/905 |

*Primary Examiner*—Regina Liang
*Attorney, Agent, or Firm*—R. Louis Breeden

[57] ABSTRACT

A display apparatus (100) having improved impact resistant mechanical qualities includes a display (102) and a mechanically coupled support bezel (110). The support bezel (110) includes peripheral walls (112) to form an aperture (114) and cantilevered clips (118) integral to the peripheral walls (112) for holding the display (102).

12 Claims, 6 Drawing Sheets

SECTION A-A

IMPACT RESISTANT DISPLAY APPARATUS

FIELD OF THE INVENTION

The present invention relates generally to display apparatus, and more specifically to an impact resistant display apparatus.

BACKGROUND OF THE INVENTION

In the field of electronics packaging, many breakthroughs have been made to provide smaller, lighter, more powerful products displaying a growing volume of information. The advent of sub-micro solid state technologies has allowed designers and manufacturers to place a growing density of electronics in a smaller space, yet the ability to satisfy the demand for displaying the growing volume of information in the smaller space has its limitations.

One limitation relates to the external forces the electronics package and its display must endure in a wide range of operational environments. In the case of electronics packaging used in portable subscriber unit applications, the display, with its potentially fragile sub-micron elements and connections, is constantly exposed to potentially damaging impact forces such as shear forces. As the display increases in size based on market demands, the display tends to become even more fragile and subject to damage when subjected to impact.

Thus, what is needed is an impact resistant display apparatus.

Preferably, the impact resistant display apparatus will also facilitate field replacement of the display when breakage does occur.

BRIEF DESCRIPTION OF THE DRAWINGS

The features of the present invention that are believed to be novel are set forth with particularity in the appended claims. However, the invention together with further advantages thereof, may best be understood by reference to the accompanying drawings, wherein:

DETAILED DESCRIPTION OF A PREFERRED EMBODIMENT

Figure 1:
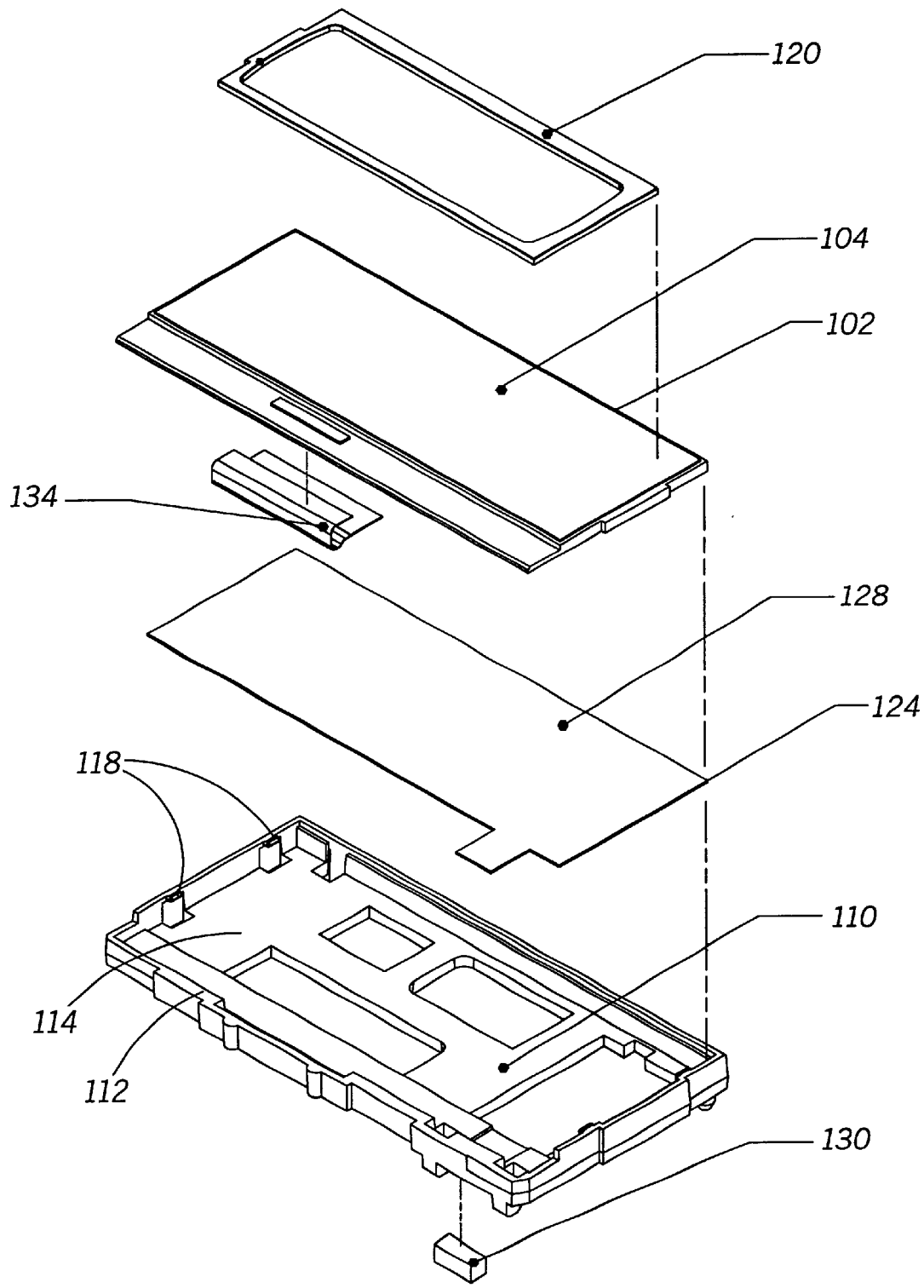
FIG. 1 is a diagram for a display apparatus in accordance with the instant invention.

The present disclosure relates to an impact resistant display apparatus. The impact resistant display apparatus is arranged to provide a larger surface area for presenting visual information, and to endure shear forces.

A preferred apparatus embodiment is a display apparatus having improved mechanical integrity, the display apparatus comprising: a display, and a support bezel, mechanically coupled to the display, the support bezel comprising: peripheral walls forming an aperture for containing the display, the peripheral walls comprising an extended portion extending beyond a viewable surface of the display in a direction perpendicular to the viewable surface; and a plurality of cantilevered clips integral to the extended portion of the peripheral walls for holding the display in the aperture, the plurality of cantilevered clips projecting towards the display in a direction parallel to the viewable surface and touching the viewable surface. Preferably, the display is mechanically coupled to an elastomeric pad. The display apparatus preferably comprises a plurality contacts electrically and mechanically coupled to the display apparatus. The display apparatus also preferably comprises an electroluminescent element. The electroluminescent element has a first surface mechanically coupled to the support bezel and a second surface mechanically coupled to the display. The display apparatus also preferably comprises a conductive elastomeric connector mechanically and electrically coupled to the electroluminescent element.

An alternative apparatus embodiment is a subscriber unit (SU) having improved mechanical integrity, the subscriber unit comprising: an electronic assembly comprising: a receiver; and a processing system coupled to the receiver for controlling the electronic assembly; and a display element comprising: a display; and a support bezel, mechanically coupled to the display and the electronic assembly, the support bezel comprising: peripheral walls forming an aperture for containing the display, the peripheral walls comprising an extended portion extending beyond a viewable surface of the display in a direction perpendicular to the viewable surface; and a plurality of cantilevered clips integral to the extended portion of the peripheral walls for holding the display in the aperture, the plurality of cantilevered clips projecting towards the display in a direction parallel to the viewable surface and touching the viewable surface. In this alternative apparatus embodiment, the subscriber unit comprises an elastomeric pad mechanically coupled to the display, and the elastomeric pad is mechanically coupled to a housing. The housing also serves as the external housing for the subscriber unit. The housing preferably encases the display, the support bezel, the elastomeric pad, and the electronic assembly. The electronic assembly of the subscriber unit preferably comprises a plurality of contacts electrically and mechanically coupled to the electronic assembly, for providing electrical coupling between the electronic assembly and the display. In the alternative embodiment, the subscriber unit display is electrically coupled to the electronic assembly for providing power to and controlling the display. The subscriber unit preferably comprises an electroluminescent element, and the electroluminescent element has a first surface mechanically coupled to the support bezel and a second surface mechanically coupled to the display. The subscriber unit preferably comprises a conductive elastomeric connector mechanically and electrically coupled between the electroluminescent element and the electronic assembly for providing power to the electroluminescent element.

The FIG. 1 diagram of an impact resistant display apparatus in accordance with the instant invention depicts, by way of example, a display apparatus 100 such as can be used with a conventional communications system. The display apparatus 100 comprises a display 102 capable of presenting visual data to an end user. The display 102 preferably consists of known multi-layer glass designs with Indium-Tin-Oxide leads such as a Liquid Crystal Display (L.C.D.).

The display apparatus 100 further comprises a support bezel 110 that is mechanically coupled to the display 102. The support bezel 110 is preferably comprised of peripheral walls 112 forming an aperture 114, further illustrated below, for containing the display 102. The aperture 114 of the support bezel 110 provides a best mode of the instant invention in terms of providing a "bathtub-type" element advantageously containing the display 102. This best mode of the instant invention advantageously provides additional protection for the display 102 from the effect of damaging shear forces. The peripheral walls 112 preferably comprise an extended portion 116 (FIG. 2) extending beyond a viewable surface 104 of the display 102 in a direction perpendicular to the viewable surface 104 as will be further illustrated below. In addition to the peripheral walls 112, the support bezel 110 preferably comprises a plurality of cantilevered clips 118 integral to the extended portion of the peripheral walls 112 for holding the display 102 in the aperture 114. The plurality of cantilevered clips 118 project towards the display 102 in a direction parallel to the viewable surface 104, and the plurality of cantilevered clips 118 touch the viewable surface 104. The plurality of cantilevered clips 118 are comprised of the same material as the support bezel, and the support bezel 110 preferably comprises a cycoloy material molded based on the teachings of the instant invention. The display apparatus 100 preferably further comprises an elastomeric pad 120 mechanically coupled to the peripheral walls 112 of the support bezel 110 after assembly of the display apparatus 100. The elastomeric pad 120, mechanically coupled to the display 102 preferably provides mechanical shock insulation to the display apparatus 100. The elastomeric pad 120 comprises known resilient materials with elastomeric qualities such as poron. A plurality of contacts 134, that are electrically and mechanically coupled to the display apparatus 100, allow the display apparatus to connect with other external elements not explicitly depicted in the FIG. 1 representation of the instant invention. The use of the plurality of contacts 134 virtually eliminates the need for implementing known hot-barring attachment techniques. Prior art electrical and mechanical elements attached utilizing hot-barring techniques are subject to cost-intensive manufacturing and after-market failures resulting from the effect of shear forces.

The display apparatus 100 preferably further comprises an electroluminescent element 124. The electroluminescent element 124 has a first surface 126 (FIG. 2), mechanically coupled to the support bezel 110 and a second surface 128 mechanically coupled to the display 102. The electroluminescent element 124 provides back-lighting for the display 102 utilizing known techniques. A practical implementation of the electroluminescent element 124 in light of the instant invention is a conventional electroluminescent element 124 sized to fit the support bezel 110. The display apparatus 100 preferably also comprises a conductive elastomeric connector 130. The conductive elastomeric connector 130 is advantageously coupled to the electroluminescent element 124 after assembly of the display apparatus 100. This interaction via coupling alleviates manufacturing failures, as well as after-market failures related to soldering or other attachment means. The conductive elastomeric connector 130 preferably comprises a combination of silicon and carbon materials fashioned in layers.

Figure 2:
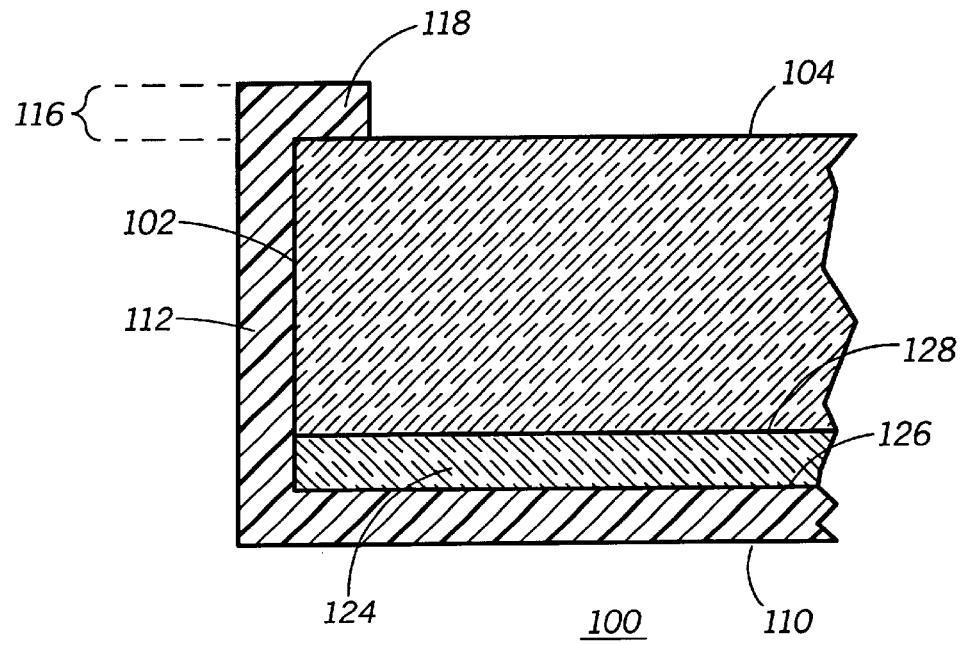
FIG. 2 is a partial cross-section view of the display apparatus in accordance with the instant invention.

The reader is referred to a partial cross-section view along the line B—B (FIG. 3), of a portion of the display apparatus 100 in accordance with the instant invention depicted in FIG. 2. This view of the display apparatus 100 depicts the support bezel 110 and one of the exemplary peripheral walls 112. The aperture 114 created by the peripheral walls 112 preferably holds the display 102 in this illustration. The extended portion 116 of the peripheral walls 112 is highlighted, and one example of the plurality of cantilevered clips 118 integral to the extended portion 116 is evident in the FIG. 2 depiction in accordance with the instant invention. The plurality of cantilevered clips 118 project toward the display 102 in a direction parallel to the viewable surface 104, and the plurality of cantilevered clips 118 are shown touching the viewable surface 104. The aforementioned electroluminescent element (EL) 124 and its relative mechanical coupling is also shown in more detail. In the FIG. 2 depiction of the EL 124, the first surface 126 is mechanically coupled to the support bezel 110, and the second surface 128 is mechanically coupled to the display 102.

Figure 3:
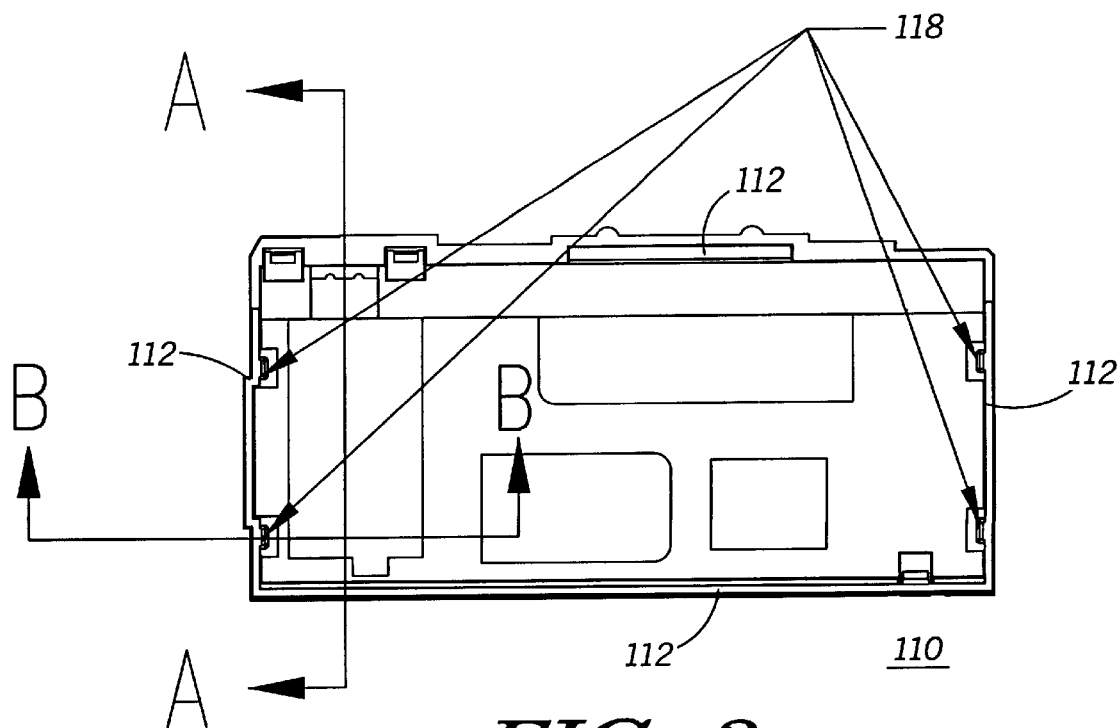
FIG. 3 is an overhead diagram of a support bezel in accordance with the instant invention.

The FIG. 3 diagram depicts the support bezel 110 displaying an overhead view indicating the relative positions of the peripheral walls 112. FIG. 3 also highlights exemplary locations for the plurality of cantilevered clips 118, which are an integral part of the mold of the support bezel 110. The plurality of cantilevered clips 118 advantageously secure the display 102 in the aperture 114 formed by the peripheral walls 112.

Figure 4:
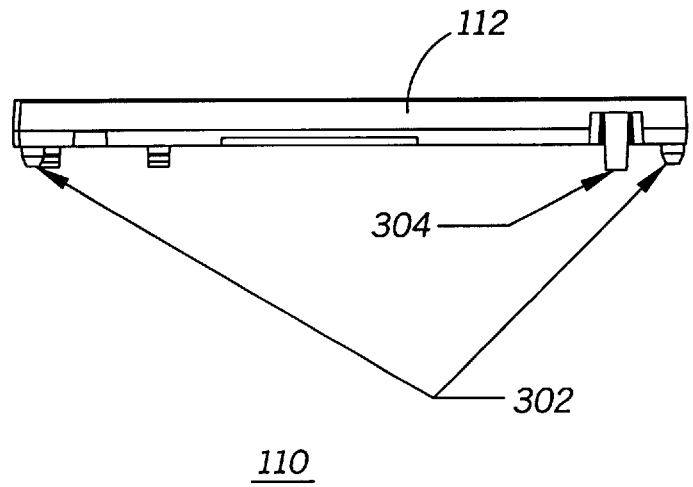
FIG. 4 is a side view diagram of the support bezel in accordance with the instant invention.

The reader is referred to the FIG. 4 representation of the support bezel 110 seen from a side view. This illustration depicts by example one of the peripheral walls 112 of the instant invention. The support bezel comprises a plurality of conventional fasteners 302 that allow the support bezel 110 to be mechanically coupled to other elements not explicitly depicted in the FIG. 4 representation. Another type of conventional fastener 304 is depicted by example providing another means for mechanically coupling the support bezel 110 to other elements. As one skilled in the art can appreciate, the plurality of conventional fasteners 302, 304 serve to depict by example yet not limit the available conventional fastening mechanisms used to mechanically couple the support bezel 110 to other elements.

Figure 5:
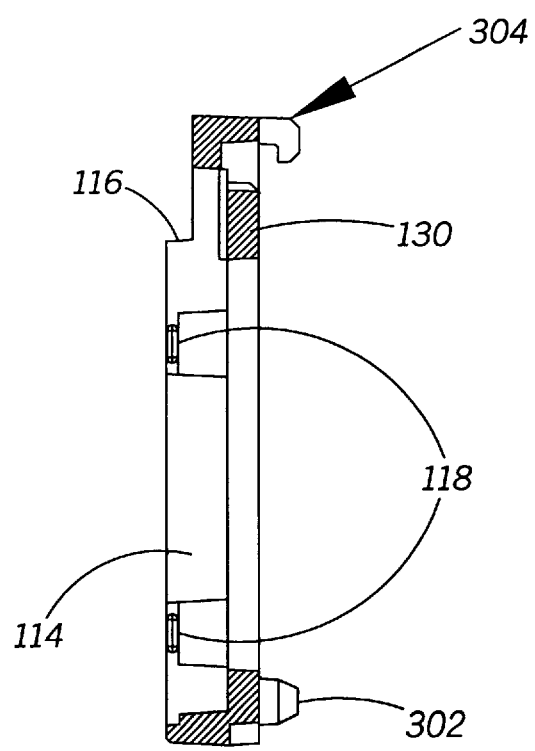
FIG. 5 is a cross-section view diagram of the support bezel in accordance with the instant invention.

As we continue in the present disclosure, the reader is referred to a cross-section diagram FIG. 5 taken along the line A—A of FIG. 3. The previously mentioned extended portion 116 of the peripheral walls is depicted by example with respect to the location of two of the plurality of cantilevered clips 118. The aperture 114 in which the display 102 rests in the display apparatus 100 is illustrated by example in FIG. 5. The peripheral walls 112 surrounding the aperture 114 in conjunction with the plurality of cantilevered clips 118 secure the display 102. The support bezel 110 thus advantageously deflects the potential shear forces due to impact, away from the fragile display 102. Since the plurality of cantilevered clips 118 secure the viewable surface 104, the display 102 is protected from first-impact forces due in part to the extended portion 116 of the peripheral walls 112. In light of the instant invention, the support bezel 110 advantageously eliminates the need for a modular display apparatus design. Modular display apparatus designs tend to have manufacturing failures, as well as expensive after-market replacement and repair costs.

Figure 6:
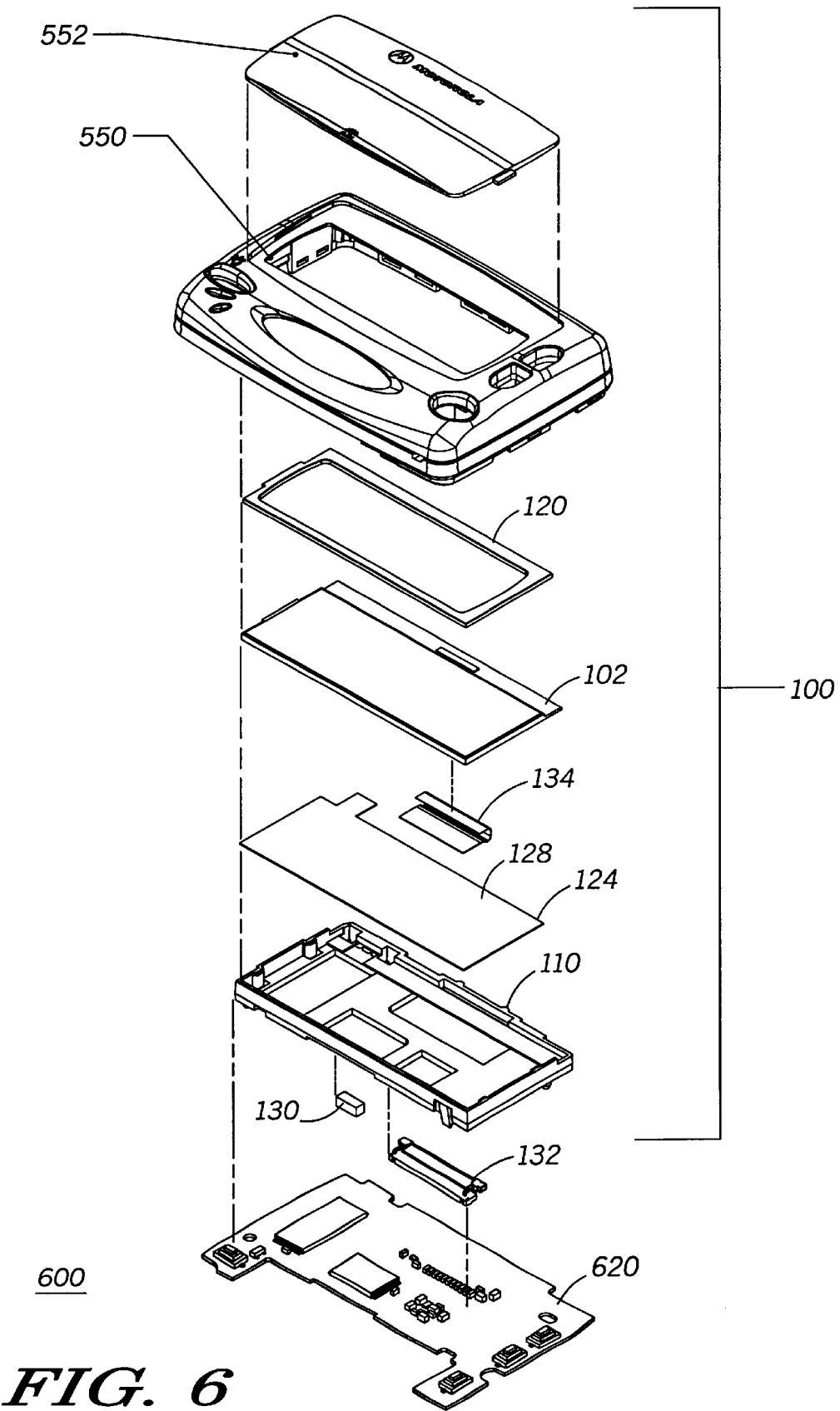
FIG. 6 is a diagram of an exemplary subscriber unit (SU) in accordance with the instant invention.

The reader is referred to the FIG. 6 diagram of the exemplary subscriber unit (SU) 600 in accordance with the instant invention. The SU 600 having improved mechanical integrity comprises the display element 100 and an electronic assembly 620. The electronic assembly 620 comprises a receiver and a processing system to be further described below. The subscriber unit 600 also comprises a plurality of contacts 132 electrically and mechanically coupled to the electronic assembly 620. The plurality of contacts 132 utilize equal yet opposite connective characteristics vis-a-vis the plurality of contacts 134 previously described. The combination of the plurality of contacts 132, 134 advantageously provides electrical coupling between the electronic assembly 620 and the display element 100. The plurality of contacts 132, 134 are representative of, yet not limited to, conventional right-angle zero-insertion-force (Z.I.F.) connectors. The use of the plurality of contacts 132, 134 exemplifies a best mode implementation of the instant invention by providing a cost effective proactive measure facilitating after-market replacement of damaged displays. The SU 600 also preferably comprises a housing 550. The housing 550 comprises known materials such as a polycarbonate plastic. The housing 550 is designed for aesthetic appeal and protection of the fragile internal components of the SU 600. The SU 600 further comprises a lens 552 that is located in a molded recess in the housing 550. The lens 552, designed utilizing known techniques and materials, serves to focus and optimize the light emitted by the display 102. The lens 552 also provides additional protection to the display 102. The conductive elastomeric connector 130 advantageously electrically couples the electronic assembly 620 and the electroluminescent element 124 of the display apparatus 100. The support bezel 110 holds the conductive elastomeric connector 130 in place alleviating the need for soldering contacts between the electronic assembly 620 and the electroluminescent element 124. The implementation of the conductive elastomeric connector 130 in the SU 600 effectively reduces costs and potential points-of-failure in both the manufacturing and after-market arenas. The elastomeric pad 120, is mechanically coupled between the housing 550 and the display 102. The elastomeric pad 120 preferably is mechanically coupled to the housing 550 utilizing materials with known adhesive qualities. The elastomeric pad 120 comprises known polymers and preferably provides mechanical shock insulation to the display apparatus 100. It is to be understood that the subscriber unit 600 is exemplary only and that much other equipment not shown here nor relevant here may be required in a practical subscriber unit.

Figure 7:
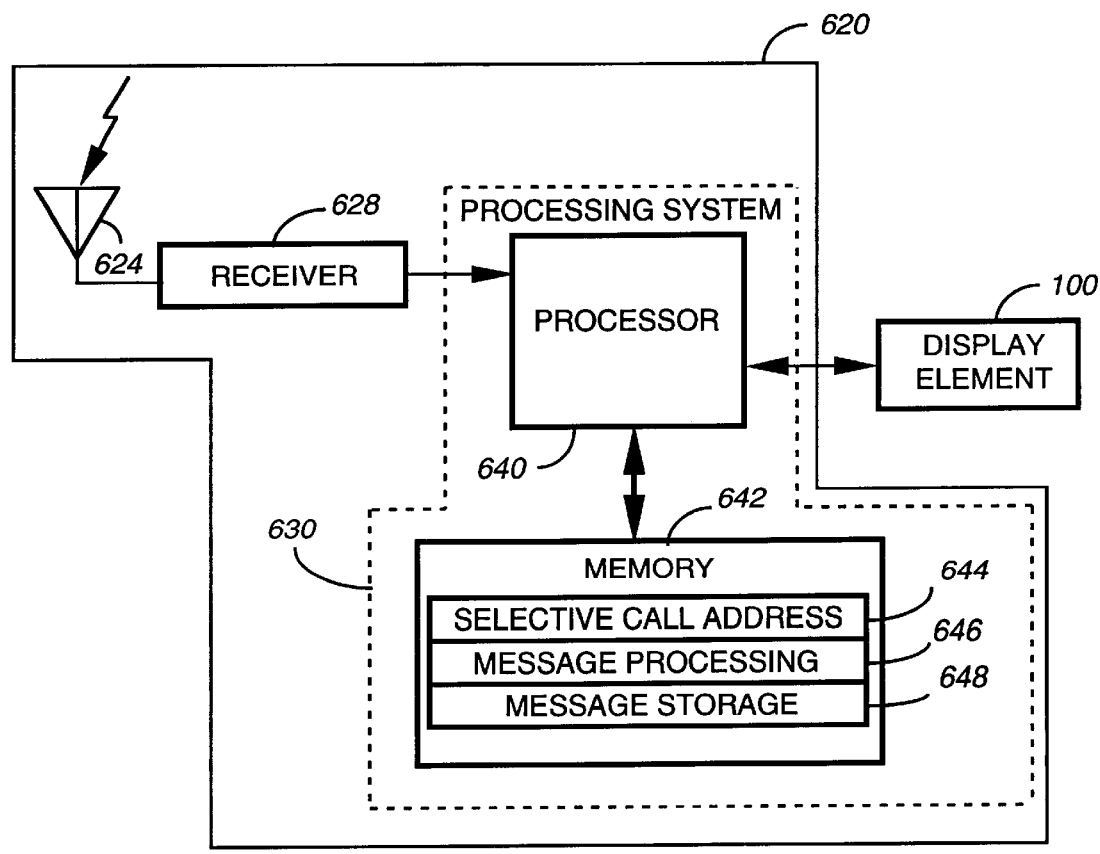
FIG. 7 is an electrical block diagram of the SU in accordance with the instant invention.

As we continue in the discussion of the instant invention, the reader is referred to the FIG. 7 electrical block diagram of the subscriber unit. The FIG. 7 diagram depicts, by way of example, a portable subscriber unit 600 such as can be used with a conventional radio messaging system infrastructure. The subscriber unit 600 comprises an antenna 624 for intercepting an outbound message from the conventional radio messaging system infrastructure. The antenna 624 is coupled to a conventional receiver 628 for receiving the outbound message. The conventional receiver 628 comprises a portion of an electronic assembly 620 within the SU 600. The electronic assembly 620 further comprises a processing system 630 for controlling the display element 100, processing the inbound messages, and for controlling the receiver 628 in accordance with the instant invention. The display element 100 is also coupled to the processing system 630 allowing the SU 600 to interface with a user. The processing system 630 comprises a conventional processor 640 and a conventional memory 642. The memory 642 comprises software elements and other variables for programming the processing system in accordance with the instant invention. The memory 642 includes a selective call address 644 to which the subscriber unit 600 is responsive, and a message processing element 646 for processing outbound messages through well-known radio messaging techniques. The memory 642 further comprises a message storage area 648 for storing the outbound messages. The processing system 630 provides power to and controls the display 102. It to be understood that the FIG. 7 subscriber unit 600 is exemplary only and that much other equipment not here shown nor here relevant may be required in a practical subscriber unit.

Figure 8:
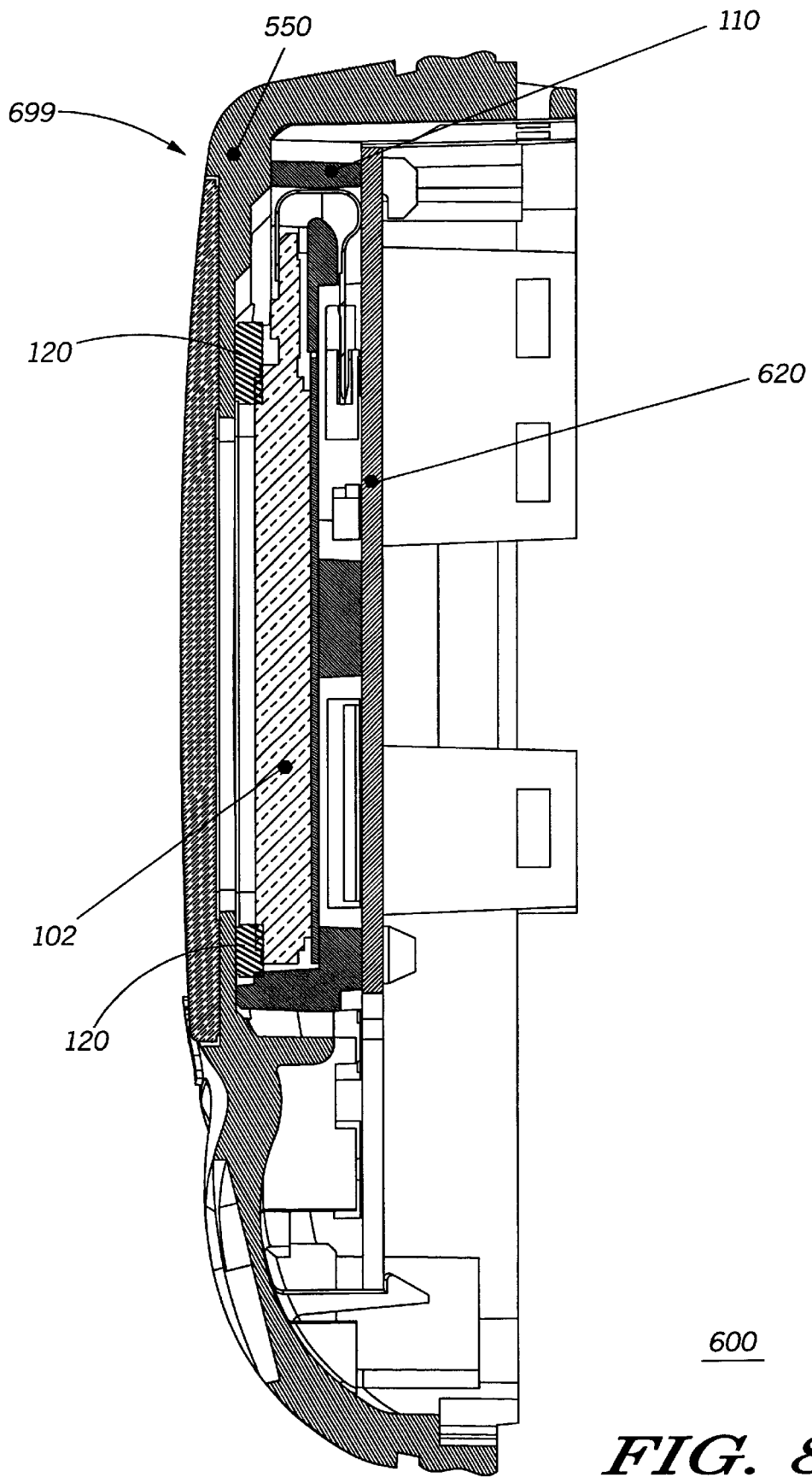
FIG. 8 is a diagram of an exemplary SU in accordance with the instant invention from a cross-sectional view.

For a clearer understanding of the inventive principles disclosed herein, the reader is referred to the FIG. 8 diagram of the exemplary subscriber unit SU 600 in accordance with the instant invention from a cross-sectional view. The display 102 is depicted by example in a recessed position relative to the outer surface of the portion of the housing 550. Since the display 102 is advantageously recessed in the support bezel 110, the display 102 is not directly subject to a force 699 depicted by example. The force 699 is exemplary of, yet not limited to, impact forces such as shear forces that the SU 600 may encounter during use. Utilizing the inventive principles taught by the instant invention, one skilled in the art can appreciate that the recessed display 102 will not directly be affected by the force 699. Instead, the housing 550 will bear the brunt of the force 699, and the display 102 is advantageously isolated from the fatal effect of the force 699. It is to be understood that the FIG. 8 subscriber unit 600 is exemplary only and that much other equipment not here shown nor here relevant may be required in a practical subscriber unit.

The reader can appreciate the implementation of the instant invention advantageously provides protection to the fragile elements of a display apparatus 100. A logical result will be a reduction in the manufacturing and after-market costs for the display apparatus 100. The display apparatus 100 will tend to have extended operational life due to the additional protection from shear forces that rendered prior art displays inoperable. The display apparatus 100 advantageously has improved mechanical integrity due to enhanced impact resistant qualities. It will be apparent to one of ordinary skill in the art that many modifications and variations of the present invention are possible in light of the above teachings. Thus, it is to be understood that, within the scope of the appended claims, the invention can be practiced other than as described herein above.

What is claimed is:

1. A display apparatus having improved mechanical integrity, the display apparatus comprising:

a display; and a support bezel, mechanically coupled to the display, the support bezel comprising:

peripheral walls forming an aperture for containing the display, the peripheral walls comprising an extended portion extending beyond a viewable surface of the display in a direction perpendicular to the viewable surface; and a plurality of cantilevered clips integral to the extended portion of the peripheral walls and comprised of the same material as the support bezel for holding the display in the aperture, the plurality of cantilevered clips projecting towards the display in a direction parallel to the viewable surface and touching the viewable surface, wherein the support bezel is a one-piece molded member of the display apparatus.

2. The display apparatus of claim 1, further comprising: an elastomeric pad mechanically coupled to the display.

3. The display apparatus of claim 1, further comprising a plurality of contacts electrically and mechanically coupled to the display apparatus.

4. The display apparatus of claim 1, further comprising an electroluminescent element, wherein the electroluminescent element has a first surface mechanically coupled to the support bezel and a second surface mechanically coupled to the display.

5. The display apparatus of claim 4, further comprising a conductive elastomeric connector mechanically and electrically coupled to the electroluminescent element.

6. A subscriber unit having improved mechanical integrity, the subscriber unit comprising:

an electronic assembly comprising:
   a receiver; and
   a processing system coupled to the receiver for controlling the electronic assembly; and a display element comprising:
   a display; and
   a support bezel, mechanically coupled to the display and the electronic assembly, the support bezel comprising:
      peripheral walls forming an aperture for containing the display, the peripheral walls comprising an extended portion extending beyond a viewable surface of the display in a direction perpendicular to the viewable surface; and
      a plurality of cantilevered clips integral to the extended portion of the peripheral walls and comprised of the same material as the support bezel for holding the display in the aperture, the plurality of cantilevered clips projecting towards the display in a direction parallel to the viewable surface and touching the viewable surface, wherein the support bezel is a one-piece molded member of the display apparatus.

7. The subscriber unit of claim 6, further comprising:

an elastomeric pad mechanically coupled to the display; and a housing, mechanically coupled to the elastomeric pad.

8. The subscriber unit of claim 7,
wherein the housing encases the display, the support bezel, the elastomeric pad, and the electronic assembly.

9. The subscriber unit of claim 8, further comprising a plurality of contacts electrically and mechanically coupled to the electronic assembly, for providing electrical coupling between the electronic assembly and the display.

10. The subscriber unit of claim 8,
wherein the display is electrically coupled to the electronic assembly for providing power to and controlling the display.

11. The subscriber unit of claim 8, further comprising an electroluminescent element,
wherein the electroluminescent element has a first surface mechanically coupled to the support bezel and a second surface mechanically coupled to the display.

12. The subscriber unit of claim 11, further comprising a conductive elastomeric connector mechanically and electrically coupled between the electroluminescent element and the electronic assembly for providing power to the electroluminescent element.

* * * * *